M. F. AND L. D. HILL.
MACHINE FOR PROJECTING CONTINUOUS MOVING PICTURES.
APPLICATION FILED JAN. 14, 1913. RENEWED NOV. 25, 1918.
1,367,475. Patented Feb. 1, 1921.
6 SHEETS—SHEET 3.
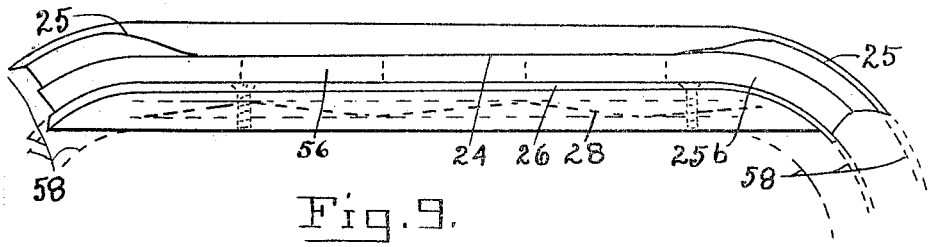
Fig. 9.
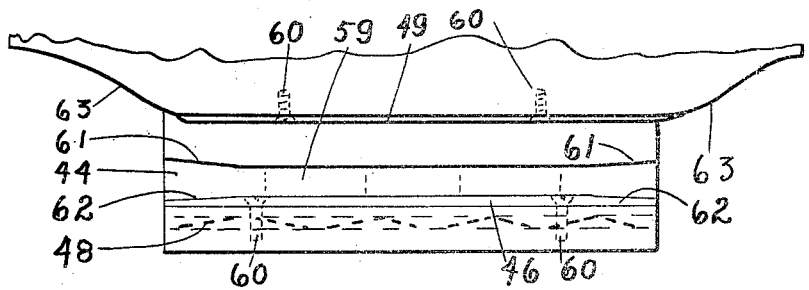
Fig. 10.
Fig. 11.
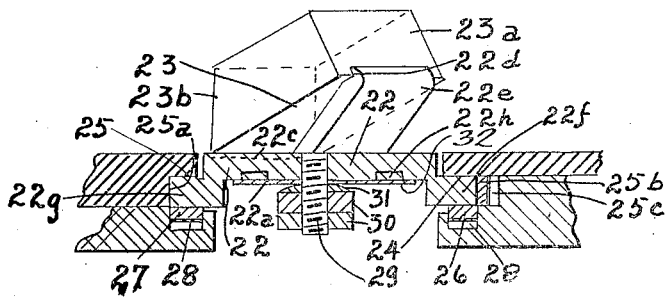
Fig. 5.
WITNESSES
Dorothy B. Barnett
Edmond N. Lysle
INVENTORS
Myron F. Hill
Lewis D. Hill
By Hill & Simms ATTYS

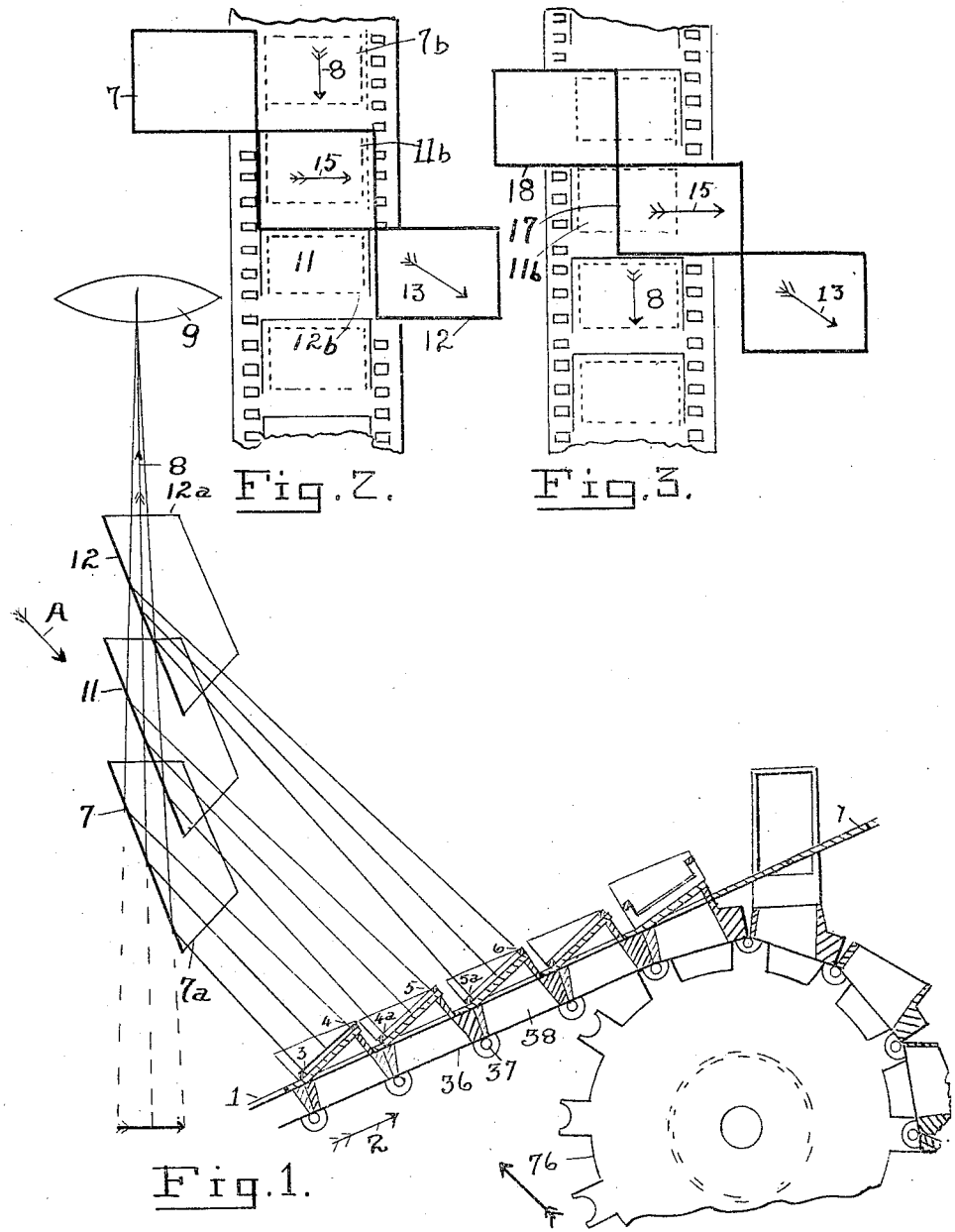

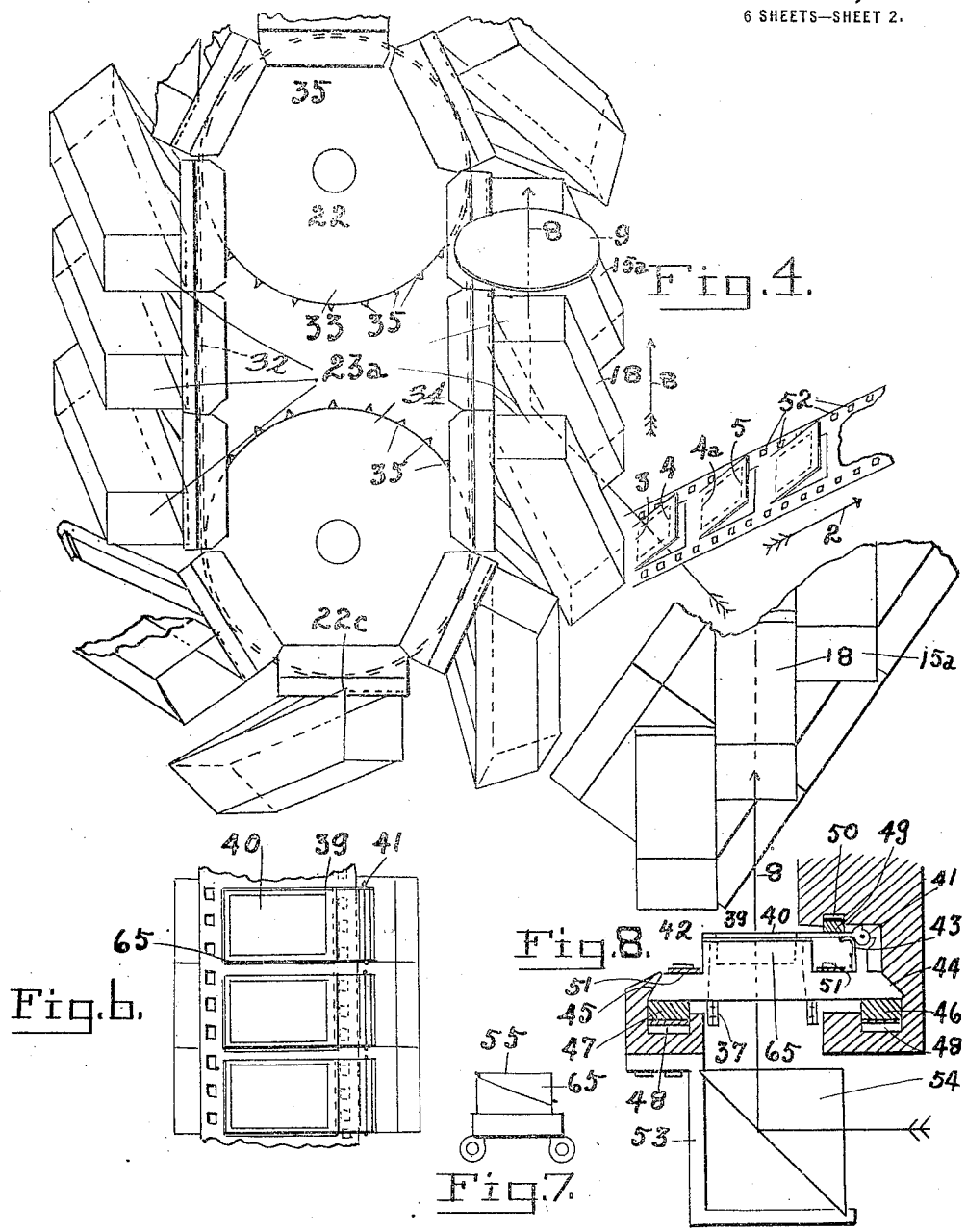

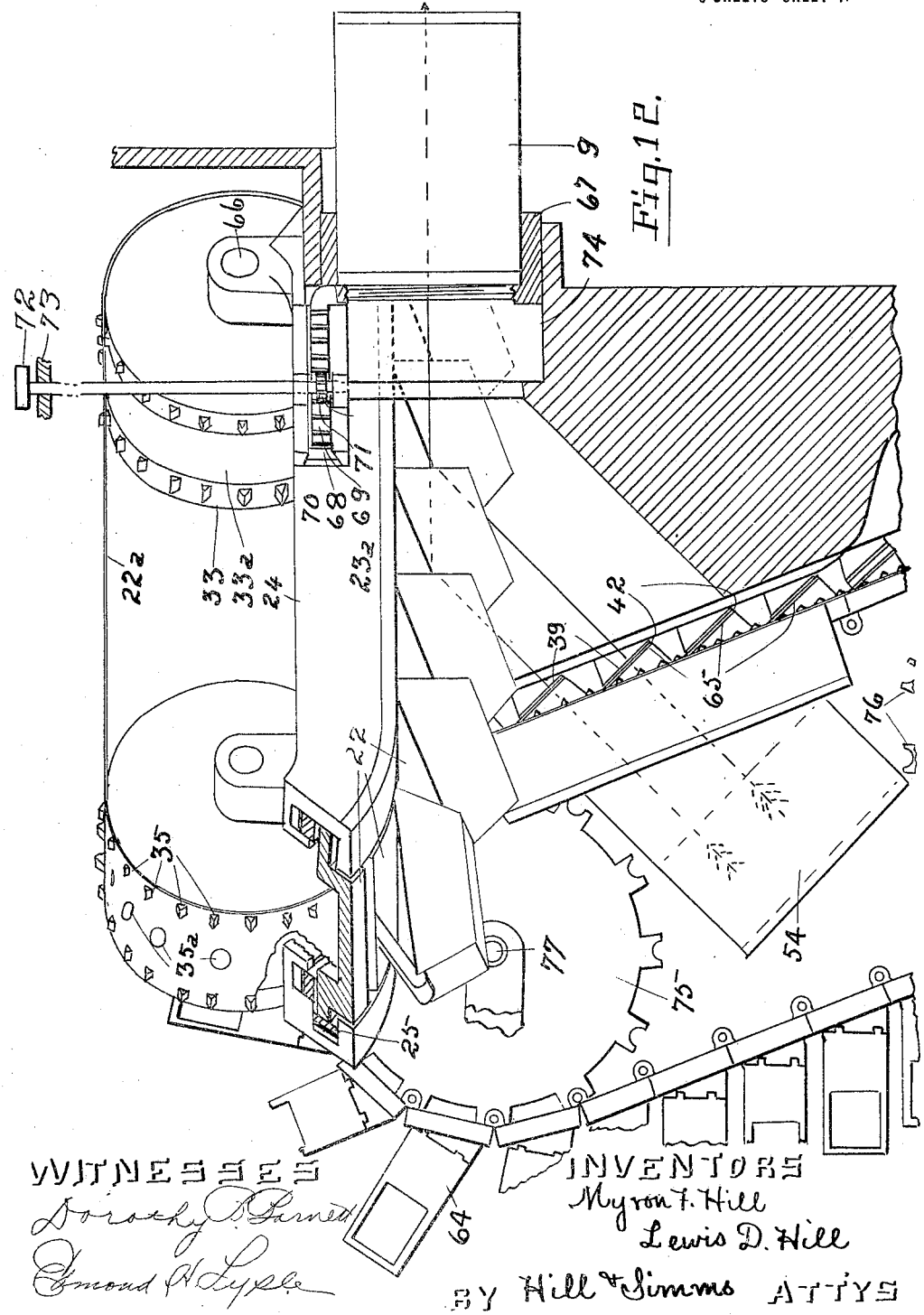

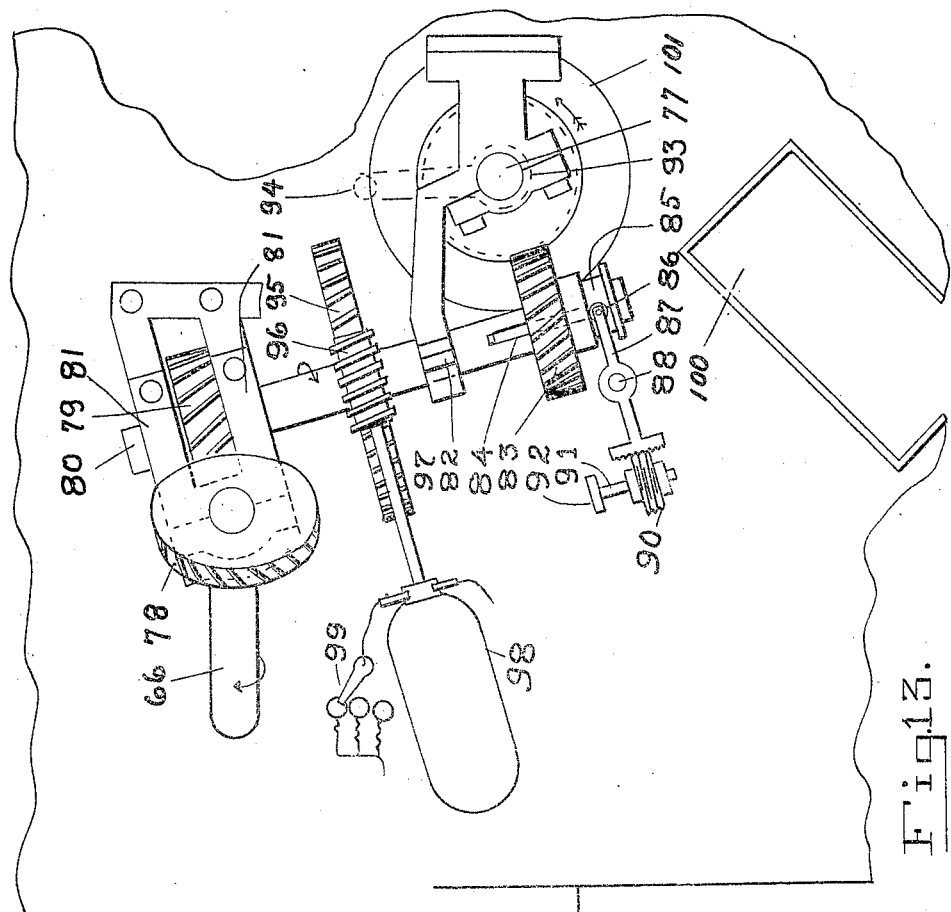

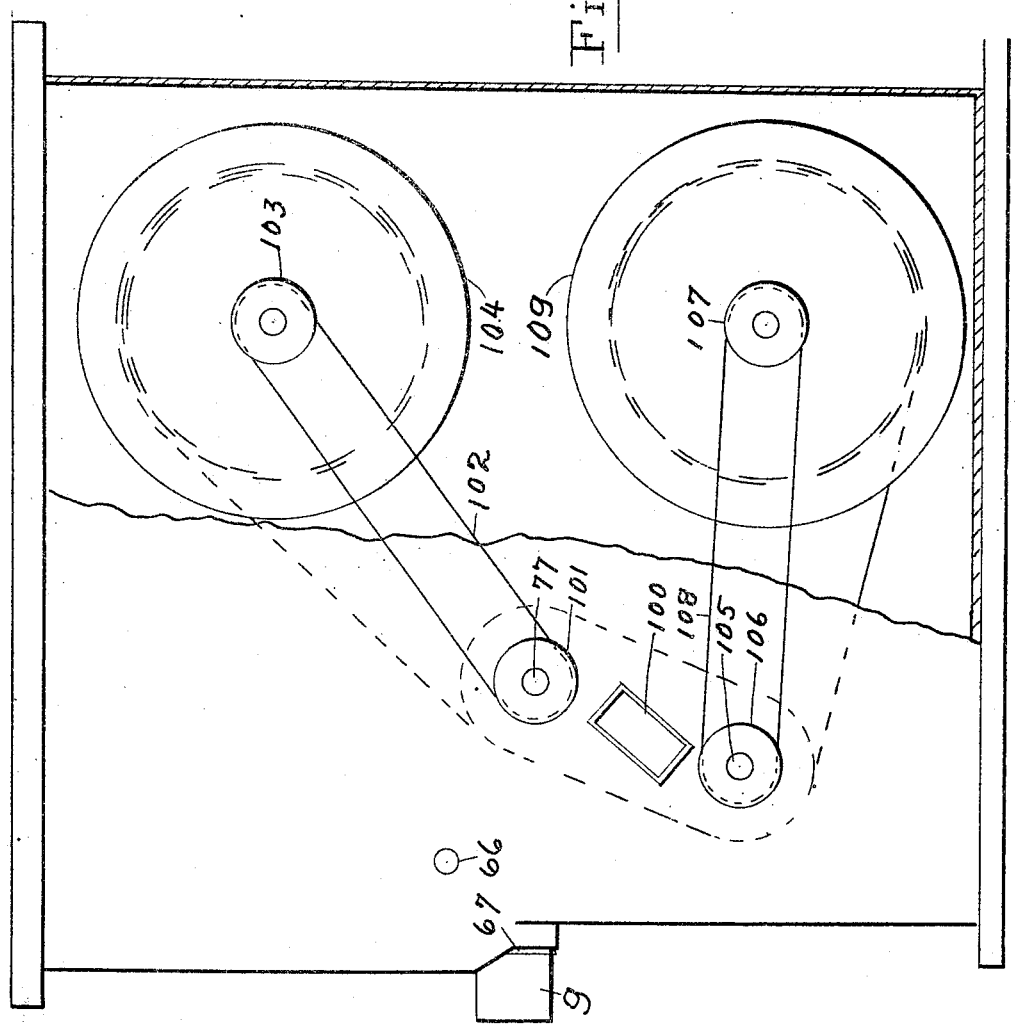

UNITED STATES PATENT OFFICE.

MYRON F. HILL, OF NEW ROCHELLE, AND LEWIS D. HILL, OF MOUNT VERNON, NEW YORK, ASSIGNORS OF TWO-THIRDS TO EDMOND H. LYSLE, OF NEW YORK, N. Y.

MACHINE FOR PROJECTING CONTINUOUS MOVING PICTURES.

1,367,475. Specification of Letters Patent. Patented Feb. 1, 1921.

Application filed January 14, 1913, Serial No. 741,920. Renewed November 25, 1918. Serial No. 264,126.

*To all whom it may concern:*

Be it known that we, MYRON F. HILL and LEWIS D. HILL, citizens of the United States, and residents of New Rochelle and Mount Vernon, respectively, in the county of Westchester and State of New York, have invented certain new and useful Improvements in Machines for Projecting Continuous Moving Pictures, of which the following is a specification.

Our invention consists of a machine for taking and projecting continuous moving pictures.

One object of our invention is to provide a continuous moving picture upon a screen, without interruption or vibration, the parts of this picture moving to correspond with the movements of the original objects from which the picture is taken.

Another object of our invention is to eliminate the vibration in the moving pictures of commerce by providing a steady instead of a jerky operating mechanism.

In our invention, while the picture on the screen is continuous, the objects shown move as usual, the change preferably sweeping across the screen in an invisible manner.

In putting our invention into practice, we employ devices which transmit a beam having variable degrees of light from a picture on a moving film to a fixed position upon the screen, and maintain the fixed position of this beam of light upon the screen in spite of the fact that the film is moving steadily. Devices are also employed to progressively displace one picture and to progressively substitute the next picture to take its place, so that when a portion of one picture is disappearing, a corresponding portion of the next picture is appearing and being substituted in its place. One result of this action is that the projecting machine may, if desired, be operated very slowly and the movements upon the screen of the picture will be continuous, steady and uninterrupted. The change on the screen during the substitution is beyond the power of the eye to detect. In accomplishing this result, we use a series of reflectors which receive the beam of light from the film and reflect it in such a way that the rays from a moving point on the film pass through the lenses of the objective and to the screen, and remain stationary upon the screen, or upon any object or objects adapted to be illuminated to show forth a picture.

Incident to this means, reflectors are shifted preferably in parallel planes. A set of reflectors is moved to coöperate with the movement of the film to receive the beams of light from the film.

In order that reflectors may transmit these pictures continuously, a plurality of reflectors is preferably employed so that each picture on the film, when being projected, is provided with its individual reflector. Our reflectors may vary in size and shape, but the portions of them which project pictures upon the screen must not overlap, substantially, two pictures on the film.

We have found it convenient to mount our reflectors upon traveling devices for continuous results, as a means of withdrawing a given reflector out of action after it has done its work for one picture upon the film, and carrying it around to such a position that it may begin its action for the following picture.

For theoretically continuous results, three reflectors at least are employed. One reflector may at one instant transmit the beam of light from one entire picture on the film, but the next instant it is transmitting only a portion of that picture. At that particular instant there must be in place a second reflector to receive the rays from the corresponding portion of the next picture. The second reflector continues to advance so that finally it transmits the entire picture which thus progressively takes the place of the first. At the particular instant when the second reflector is transmitting the whole of a second picture, the first reflector has preferably gone out of action. At the same instant there should be a reflector ready to transmit the first portion of the second one as it disappears. For convenience, a number of reflectors are preferably employed. The continuous film might, however, be associated with but one or two reflectors for less perfect results.

Each reflector is preferably caused to travel along guideways and by means of the carrier. Each reflector, while in action, preferably travels in parallel planes in a diagonal direction; that is, it travels in a direction having three components, one laterally across the film picture; a second lengthwise of the film, and the third at a direction diverging from that of the film, the diagonal path being a resultant of these three motions.

Preferably, we employ a simple mechanism that may contain the following several features:—

First:—The beams of light from all pictures travel along an established axis or pathway through the objective to the screen.

Second:—Reflecting devices reflect moving beams along this fixed pathway.

Third:—The reflecting devices or the active portions of them travel in the direction of the film at a speed in that direction proportionate to the speed of the film.

Fourth:—The reflecting devices move across the film to allow one reflecting device of one picture to displace that of another as the successive pictures on the film disappear from view upon the screen.

Fifth:—The focal distance from any picture on the film in all its active positions to the objective remains the same.

Sixth:—The angle of divergence is such that a constant focal distance between the picture on the film and the objective is maintained.

Seventh:—The pictures on the film are tilted up at an angle to maintain the virtual image parallel to the screen.

We have described our invention as to its relation to projecting pictures. It is possible also to use our invention for camera purposes, thereby taking pictures in a continuous manner.

For the reflectors heretofore described, we propose using prisms preferably of glass, employing such angles as will give total internal reflection.

Figure 1 shows a diagram view of the paths of the prisms and film pictures.

Fig. 2 is a view taken in the direction of the arrow A, Fig. 1, of the registration of the prisms, or at least the reflecting portions of the prisms with the pictures upon a film.

Fig. 3 is a similar view, taken after a short interval of time when both film and prisms have traveled a short distance in their respective directions.

Fig. 4 is a side view of the prism-carrying devices.

Fig. 5 is a sectional view of a block carrying a prism with the guideways in section.

Fig. 6 is a plan view of the film and the film-carrying devices.

Fig. 7 is a side view of a block or link of the chain which carries the film across the line of vision.

Fig. 8 shows an end view of a similar block with the guideways in section.

Fig. 9 is a side view of one of the guideways for the prism carrying blocks taken from between the two guideways.

Fig. 10 is a corresponding view of the right-hand guideway shown in Fig. 8, adapted to guide the links of the film carrying chain.

Fig. 11 is a top view of the guideway shown in Fig. 10.

Fig. 12 is a vertical elevation of the film and prism carrying-devices, and their assembly with relation to each other and to the objective.

Fig. 13 is a view of the synchronizing mechanism therefor.

Fig. 14 is a view of one side with the synchronizing gears removed, and part of the casing in section.

In Fig. 1 is shown a film 1 adapted to travel in the direction of the arrow 2. There may be a picture upon this film between the points 3 and 4, and between 4ª and 5, and between 5ª and 6, and so on, the separate pictures adapted to be projected in spite of the difference in position to the same location upon the screen.

The picture in the position 3—4 may be reflected by a prism in the position shown at 7. The rays enter the prism through the end 7ª in a substantially perpendicular direction. The rays then are reflected from the back of the prism 7 in the direction of the arrow 8 through the lens or objective 9 to the screen. Likewise, when the same picture has reached the position shown between the points 4ª and 5, the prism has advanced to the position shown at 11, the rays of light from the picture entering the prism and being reflected in the direction of the arrow 8 through the lens or objective 9 to the screen.

Likewise, when the picture has reached the position shown between the points 5ª and 6, the prism has reached the position shown at 12, and if any rays of light enter and leave the prism, they pass through the objective 9 to the screen, as heretofore. Between these extreme positions, the pictures may have an innumerable number of positions, all of which are preferably parallel with each other, and the prisms may have a corresponding infinite number of positions, the positions of their reflecting surfaces also being parallel with each other.

When the rays of light leave the prisms, they pass through the ends of the prisms in a direction substantially perpendicular to the plane of the end surface of the prism, as shown, for example, at 12ª.

In other words, as the pictures upon the film 1 travel in the direction of the arrow 2, the reflecting surfaces of the prisms travel in a direction corresponding to the direction of the film. The prisms actually travel in a direction which is the resultant of three elemental directions of motion. One direction is parallel to the movement of the film. Another direction is laterally across the first direction to permit the prisms to travel across the film, as indicated by the arrows 15 in Figs. 2 and 3. The third elemental direction of motion is divergent from the direction of the film, as shown by the arrow 8 in Fig. 1. This motion is for the purpose of maintaining an equal focus during the various successive positions.

Since a plurality of prisms is employed, those shown at 7, 11 and 12 may indicate the distances in the direction of the arrow 8 between them. These prisms are also shown in projection in Figs. 2 and 3, viewed in the direction of the arrow A, Fig. 1. In Fig. 2 the prism or reflector 7 is in a position where it will soon begin to reflect a portion of a picture shown within the broken lines $7^b$. The reflector at 11 in Fig. 2 is in a position to reflect the whole picture inclosed within the lines $11^b$ and the reflector 12 has passed away from the picture inclosed within the broken lines $12^b$. In this position, in other words, the reflector 11 is doing the entire work.

The film is traveling in the direction of the arrow 2, and the prismatic reflectors are traveling in a corresponding direction, so that the top and bottom edges of the reflectors always lie between the successive pictures upon the film. No reflector overlaps two pictures at any moment. The reflectors are also traveling laterally across the film in the direction of the arrow 15, so that as the film advances, one reflector goes out of action as the other reflector comes into action.

In Fig. 3 these reflectors are shown in new positions. It will be noticed that the film has traveled downward, a distance equal to a portion of the lineal length of a picture. In this position the middle reflector shown has traveled to the position 17, in which position it reflects only that portion of the picture $11^b$ which lies beneath itself or adjacent thereto, whereas the complemental portion of the picture on the screen is projected from the picture $7^b$ on the film, this portion being substantially that which lies beneath the reflector in a position 18, and inclosed within the broken lines $7^b$. In this way a portion of one picture is reflected by one reflector, and a complemental portion of another picture is reflected by another reflector.

This dividing line is not evident upon the screen since rays of light from any point along the dividing line in the film picture are reflected by both reflectors and projected through the objective upon the screen, so that upon the screen, at all times, every point of a complete picture taken from two complemental portions of pictures upon the film reach the screen. The only rays that are lost are those which impinge upon the dividing line between the prisms.

It will be understood, of course, that the rays from any point of a picture diverge to the lens, and all of the rays from any one point that are caught by the lens are concentrated to a corresponding point upon the screen. Naturally, as most of these rays radiate from the film picture, some of them might strike upon the sides of any prism being used as a reflector. Such a prism is shown in Fig. 5. This prism may be mounted upon a block 22, and have a reflecting surface 23. The end of the prism $23^a$ is disposed parallel with the picture upon the film to receive the rays from the film as closely as possible in a perpendicular direction to the plane of the end of the prism. Since, however, some of these rays are diverging, as stated, from any point of the picture, they are apt to strike the sides of the prism either inside or outside. To eliminate any wrong reflection which would create confusion upon the screen, the two sides of the prisms and their tops are ground so that they have a frosted effect, and then are preferably painted dead black. This suppresses any internal or external reflection from the sides of the prisms. The bottom and ends of the prisms are polished. Crown glass gives good results. Each prism is mounted by having its lower corners and edge resting in an acute angled groove in the block 22, as indicated at $22^c$, shown also in Fig. 4. Its rear end is held by a corresponding groove $22^d$ in the support $22^e$ which is fixed to the block 22 in a suitable position, or which may form an integral part of the block 22. The various blocks 22 carrying the various prisms $23^a$ are carried across the line of light in a straight line located, as heretofore described. They are preferably held in guides shown in section in Fig. 5.

Each block is provided with lateral extensions $22^f$ and $22^g$, which are pressed upward against guiding surfaces 24 and 25 by means of strips 26 and 27 respectively, these strips being supported by leaf springs 28, so that at all times the blocks are held securely against the guiding surfaces 24 and 25.

The lateral extension $22^g$ is also pressed sidewise against the guiding surface $25^a$ by the strip $25^b$, actuated by the spring $25^c$, so that at all times the blocks are pressed laterally against one guiding surface. These guiding surfaces and pressure strips may be made of anti-friction material of any suitable kind.

The blocks are carried around by any suitable endless carrier. Each block may have a post 29 securely attached to it in its middle or in any other suitable portion by suitable nuts 30. A half-rounded washer 31 may be used between the nuts and the band 32 which may be endless and of thin spring steel, or it may be of any other suitable material. This band is carried around by sprockets 33 and 34, as shown in Fig. 4, the sprockets having teeth 35 engaging equispaced perforations in the band as shown at 35 in Fig. 12, and as indicated in broken lines in Fig. 4 at the top of the figure.

In Fig. 4 is shown the direction of travel of the film, the direction being shown by the arrow 2. In this view is shown also how a portion of the picture between the lines 3 and 4 is transmitted through the prism in the position 18, corresponding with the position 18 in Fig. 3. It is also evident how a portion of the picture between the lines 4$^a$ and 5 may be reflected through the prism in the position 15. These rays pass through the prisms and through the lens or objective 9. The lens 9 is located parallel to the end of the prism at 18, and the pictures upon the film are tilted up so that they are parallel with the nearest end surface of the prism 18. Since all the prisms in their active positions are parallel with each other, this relative location of lenses and pictures is the same with all the prisms when in the line of light.

In Fig. 4 the guideways shown in Fig. 5 are removed. There may be twelve prisms for convenience, or there may be a larger number of prisms as shown in Fig. 12, the approximate dimensions shown in Fig. 12 permitting fifteen or sixteen prisms.

In case colored pictures are to be projected, the prisms may also be light filters. If two color projection is being effected, the number of prisms should be some multiple of two. If three color projection is effected, the number of prisms should be some multiple of three, the successive colors being orange-red, blue-green, and yellow. Such pictures may be photographed with this projecting machine used as a camera, with colored prisms. Forty-eight pictures per second will give good results in taking and in projecting.

While the steel band and the guideways seem to be the most accurate method of carriage, these prisms may be carried around in any suitable manner. The driving sprocket acts upon the band equally during each successive instant, and the blocks are held in correct position; the grooves 22$^h$ being provided to receive the ends of the sprocket teeth when they engage the perforations in the band. The holes 35$^a$ receive the various posts in the various prism blocks.

In Figs. 6, 7 and 8 are shown the means for holding the film pictures in place and for carrying the film across the line of light. The chain in Fig. 1, comprising the links 36 may be diagrammatic, or may be used in actual practice, each link being pivoted to the next one by means of the ears and pivots 37. Each link has an open space 38, admitting the light to the film from beneath.

The portion of the picture upon the film, which is transmitted to the screen is inclosed within the framing device 39, shown in Fig. 6. This framing device consists of a hinged cover having an open space 40, and the hinged pivot 41. The various framing devices are similar in construction, as shown in side elevation in Fig. 8, where each framing device rests upon the uptilted portion of the film 42. Any suitable means may be provided to cause these framing devices to remain open when not coöperating with the film. A spring may perform this function, as shown at 43. The top of each framing device is preferably parallel to the beveled guiding edges of the blocks, as shown at 55 in Fig. 7, this surface coöperating with the pressure strip 49 for the purposes heretofore described.

Each link may constitute a supporting block for the uptilted picture of the film, and may be guided in its motion across the line of light by suitable guideways 44 and 45. Each block is pressed against these guideways by friction strips 46 and 47, supported by the leaf-springs 48. The framing devices may be held firmly upon the uptilted portion of the film by means of the pressure strip 49, engaged by the leaf-spring 50 for this purpose. Various blocks may be provided with teeth 51 to engage the perforations 52, in the film shown in Fig. 4.

Beneath one of the guideways is located a bracket 50 adapted to carry a reflector such as a prism 54 adapted to receive the illumination from the source of light from a side direction, and reflected upward through the openings in the blocks of the chain to the pictures upon the film, for the purpose of illuminating the picture. The light enters the apparatus through the aperture 100, shown in Figs. 13 and 14. The aperture may be provided with the usual automatic shutter and is closed during photographic action. In practice, an electric arc with an eight-inch condenser is employed to coöperate with pictures upon the film of the approximate size shown in Figs. 1, 4, 6 and 8. This provides for sufficient illumination of the film pictures, in spite of the fact that they may be at different distances from the source of light.

In Fig. 9 is shown a view of one of the guideways adapted to guide the prism blocks while the prisms are traveling across the line of light. The guiding edges of the prisms travel in the guideway 56. The blocks are guided by the upper surface 24, and are held against this surface of the strip 26. The wavy leaf spring may extend from one end of this strip to the other, as shown in broken lines of 28. The upper guiding surface 24 is inclined, as shown at 25, to permit the rectangular guiding flanges of the blocks to take the turn properly. These guideways may be continued all the way around the endless carrier, as indicated by the broken lines 58, and to guide the blocks in all their successive positions, if desired, so that any noise of the blocks entering a guideway may be eliminated.

In Fig. 10 is shown a guideway for the film carrying blocks, this being a side view of the right-hand guideway shown in Fig. 8. This guideway is provided with the slot or opening 59, the guiding surface 44 and the upper pressure strip 49. The lower pressure strip is shown at 46, and the leaf spring in heavy broken lines 48. The pressure strips above and below may be loosely secured by means of the screws 60, which limit the distance which the springs can push them in the direction of the blocks. The slot or opening 59, is suitably flared, as shown at 61 and 62, to render the entrance and exit of the blocks easy and quiet. The guideways may, if desired, extend all the way around the endless carrier, and the pressure strips may likewise be extended all the way around in sections for the purpose of rendering the traveling action of the blocks silent.

An extension 63 is provided which is adapted to guide the framing covers 39 from their open position shown at 64 in Fig. 12 to their closed position, as shown at 65, in Figs. 6, 7, 8 and 12. These guiding surfaces 63 are also shown in Fig. 11, which is a plan view of the device shown in Fig. 10. These guiding surfaces render entrance to, and exit from the guideway for the blocks and framing devices easy and quiet. They may be extended around the entire path of the chain, if desired.

In Fig. 12, the sprocket 33 is shown to be double and having a space between the two portions at 33ᵃ. This is to make possible the passage of the post 29 and the nuts 30 of the various blocks, and the width of this opening should be greater than the width of the nuts. The sprocket 33 is mounted upon the shaft 66, the other end of which passes through the rear of the housing (see Figs. 12, 13 and 14) which is adapted to be light-tight, and adapted to carry the various working parts. The objective 9 may be of the usual type, containing two lenses, and may be screwed into the holder 67 which is provided with an extension 68, carrying a rack 69, the extension being guided in the dove-tailed groove 70. A pinion 71, engaging the rack is adapted to be operated by the handle 72 outside of the casing, the wall of which is represented at 73. By turning the handle 72, one may cause the rack to travel in its guideways, and as the rack and extension 68 are secured to the objective 9, the latter is caused to move. The holder 67 is journaled freely in the recess 74, in which it is adapted to be adjusted back and forth for the purpose of securing proper focus. The outside of the guideway 24 is here indicated in full lines; the opposite guideway 25 also being shown. The various blocks 22 are adapted to carry the various prisms 23ᵃ across the line of light in the diagonal path illustrated. This diagonal path is indicated by the arrow 13 in Figs. 2 and 3 combined with the arrow 8 in Fig. 1, and its relation to the arrow 2.

The film may travel in the direction of the arrow 2, Fig. 1. When a prism has traveled a distance equal to the distance from any corner of one prism to the same corner of the next prism, each picture on the film must have traveled for best results a distance equal to that between the top of one picture and the top of the next picture, in the direction of the film movement. The portion of the film which is in active position is carried by the series of blocks forming the endless carrier, as illustrated in Fig. 12. This carrier travels over two sprocket wheels, as shown at 75 and 76, the latter being shown only to a small degree, but which may be identical with sprocket 75. Each sprocket is mounted upon a shaft 77 in suitable bearings.

In Fig. 13 it is shown how the shaft 66 of the sprocket 33 is carried through the casing to the outside, and is provided with one member of a skew gear 78 which meshes with the other member 79 of the skew gear mounted upon the shaft 80. The gear 79 is fixed to the shaft 80, and may form a part therein, and is snugly held between bearings 81. The shaft 80 may also be provided with an additional bearing 82 for alining purposes, and is provided with a slidable gear 83, loosely journaled on the shaft, but adapted to slide along the key 85 adapted to receive a roller 86 pivoted upon a lever 87 fulcrumed at 88 and provided with a threaded rack 89 meshing with a screw-threaded device 90. The screw-threaded device 90 is fixed to the shaft 91, and provided with a handle 92, and is mounted in suitable bearings, so that in turning the shaft, the lever 87 may be shifted in its position and caused to shift the position of the gear wheel 83. Since this gear wheel meshes with the corresponding gear 93, the relative positions of the shafts 66 and 77 may be shifted. It will have been understood that the shaft 77 projects through the casing from within where it carries the sprocket 75, as shown in Fig. 12. Upon the shaft 77 may, if desired, be attached a handle 94 for the purpose of operating the machine. I prefer, however, to employ a worm gear 95 fixed to the shaft 80 and operated by the worm 96 upon the shaft 97 adapted to be rotated by the motor 98, the speed of which may be varied by the rheostat 99. The motor 98 may be driven by any suitable source of power, and may be reversed for rewinding the film.

The mechanism shown in Fig. 13 acts as a synchronizing mechanism, and is adapted to cause the reflectors and the pictures upon the film to travel through corresponding distances in the same periods of time. For this reason, the sizes of the skew gear and worm wheels 78, 79, 83 and 93 must be so proportioned in their dimensions as to secure correlative distances of travel within any given period of time, as hereinfore described.

An opening 100 is provided to admit light from any suitable source, such as an electric arc and a large condenser, into the casing where it may enter the prism 54 shown in Figs. 8 and 12.

In Fig. 14 is shown an outside elevation of our machine with the gearing shown in Fig. 13 removed, and part of the casing broken away to show the reels. The shaft 77 is provided with a pulley 101 shown also in Fig. 13, which is geared by a belt 102 to a pulley 103 upon a reel 104 mounted in suitable bearings. The sprocket indicated at 76 in Fig. 12 is provided with a shaft 105 shown in Fig. 14. Upon this shaft is fastened a pulley 106 which is belted to the pulley 107 by means of the belt 108 to operate the reel 109, so that it winds upon itself the film 1 after it has passed through the line of light. Belts 102 and 108 are loose so that they may easily slip upon their pulleys to compensate for the reducing number of rotations per minute of the reels 104 and 109 as the film winding progresses. The pulleys and belts shown are so gaged as to operate the reels at the fastest required speeds. The belt 102 is not used during exhibition of the film, but is slipped off from its pulleys. The belt 108 is employed for operating the reel 109 for winding purposes during the exhibition of the film. When the film is being rewound after the exhibition, upon the original reel 104, the belt 102 is replaced upon its pulleys and the belt 108 is slipped off from its pulleys, or from at least one of them.

The focal distance from the objective 9 to the film pictures is affected by the prisms. The glass has the effect of bringing the virtual image nearer to the objective, and this has to be compensated for by increasing the actual focal length. The index of refraction for various transparent mediums varies, and must be taken into account when determining the limits of focal adjustment.

In operation, the reel 104 is first equipped with a length of film placed in the box shown in Fig. 14. The empty reel 109 is also located in the box, the belt 108 slipped over the pulleys 106 and 107, and the end of the film on the reel 104 passed over the chain composed of the hollow blocks 38 and attached to the core of the reel 109 in the usual way. The motor 98 is then switched into circuit to be operated at the proper speed and in the right direction to cause the film to pass from reel 104 to 109. This movement is effected by causing the worm 96 to engage the gear 95 as shown in Fig. 13, so that the shaft 80 turns in the direction of the arrow 110. This causes the gear 83 to drive the gear 93 in the direction of the arrow 111. The gear 93 drives the sprocket 75 shown in Fig. 12, so that the film is caused to travel across the line of light reflected upon the pictures from the prism 24.

The pictures are tilted up as shown in Figs. 1 and 12 so that all parts of the pictures have substantially constant focal distance from the objective 9. The uptilted portions of the film are clamped in place by the hinged framing devices 64, while passing through the line of light. These framing devices are open to allow the film to enter the chain arrangement and to leave it, as indicated in the broken lines in Fig. 14. The shaft 80 also drives the skew gear 79 which is in mesh with its mate 78 driving the shaft 66 in the direction of the arrow 112. This causes the sprocket 33, in Fig. 12, to carry the band 22$^a$ in such a way that the blocks 22, carrying the prisms 23$^a$ pass across the line of light so that beams of light leaving the uptilted pictures upon the film are reflected out through the condenser 9 along the fixed pathway to the screen. This screen is so arranged that the beam of light from the objective falls perpendicularly upon it.

The shaft 105 in Fig. 14 is driven by the chain of hollow blocks 38. The shaft 105 also drives the pulley 106, the belt 108 and the pulley 107, thus causing the reel 109 to rotate upon its shaft. The reel 109 thus is caused to wind up the film as it unwinds from the reel 104, and when the reel is filling up, the belt 108 slips freely upon the pulley 107, thus arresting the speed of rotation of the reel 109. In this way a tension is kept upon the film 1 during exhibition.

After the exhibition is over, the belt 108 is slipped off from one or both pulleys and the belt 102 is slipped on to the two pulleys 101 and 103 so that as the shaft 77 is caused to travel in the opposite direction by reversing the motor 98, the reel 104 rewinds upon itself the film 1 which is correspondingly rewound from the reel 109.

While we have described an arrangement of prisms, and tilted film pictures having equal focal distances from the objective in their two directions of travel, and the prisms are so arranged that one prism passes slowly out of action at the same time that the following prism passes slowly into action, it is quite possible that many other arrangements may be made by which the same result upon the screen may be obtained. Such other arrangements are shown in other applications filed concurrently with or subsequent to the filing of this case. This case is intended to be the generic case with respect to the broad principles of continuous projection, and the other cases are intended to be specific. The other applications referred to are Serial No. 771,037, filed May 31, 1913 and Serial No. 771,875, filed June 5, 1913.

What we claim is:

1. In a continuous motion picture machine, the combination of a film, means to continuously move said film longitudinally, a series of mirrors, means to operate said mirrors in conjunction with said film to synchronize said film and mirrors so that one mirror does not overlap two pictures on a film in its operation, said last-mentioned means including worm gears and means to adjust said synchronizing means to accurately position said mirrors with relation to the pictures upon the film, and comprising means to shift one of said worm gears in the direction of its axis.

2. In a continuous motion picture machine, the combination of an objective, a film carrying a series of impressions or pictures, means for moving said film steadily longitudinally, a guide-way therefor to guide said film through the reflected field of said objective, optical devices arranged in the field of said objective to reflect said impressions to said lens and to maintain a constant optical distance between said portion of said film in said field and the optical center of said objective, said reflectors comprising a plurality of mirrors, guide-ways for said mirrors providing rigid surfaces, and spring pressed strips coöperating with said guide-ways in two directions.

3. In a continuous motion picture machine, the combination of an objective, a film carrying a series of impressions or pictures, means for steadily moving said film continuously, and optical devices to reflect said pictures from said film along a fixed pathway to said objective and thence through said objective to a fixed focused position, said optical devices comprising a plurality of mirrors and guide-ways therefor provided with rigid surfaces and spring pressed strips coöperating with said guide-ways in two directions.

4. In a continuous motion picture machine, the combination of an objective, a film carrying a series of impressions or pictures, means for steadily moving said film continuously, optical devices arranged to transmit said pictures through said objective to a fixed focused position, and guide-ways for said optical devices, consisting of rigid surfaces and spring pressed strips coöperating with said guide-ways in two directions.

5. In a continuous motion picture machine, the combination of an objective, a film carrying a series of impressions or pictures, a series of reflectors, means to move said reflectors with and across said film in a diagonal line passing through the axis of said objective and divergent to a line intersecting the diagonally opposite corners of the projected pictures, said means to carry said reflectors comprising a non-stretching band and pivotally mounted blocks.

6. In a continuous motion picture machine, the combination of an objective, a film carrying a series of impressions or pictures, a series of reflectors, means to move said reflectors along a fixed pathway extending in a diagonal line divergent to a line intersecting the diagonally opposite corners of the projected pictures and intersecting the axis of said objective, said means to move said reflectors comprising a non-stretching band, blocks pivotally mounted on said band and each provided with one of said reflectors, sprockets engaging said band and engaging said perforations in said band, means to drive said sprockets, gearing between said sprocket driving means, means to move said band longitudinally continuously and driven by said sprocket driving means to maintain a constant optical distance between the center of said objective and a picture passing through the field of illumination of said objective.

7. In a continuous moving picture machine, the combination of an objective and film, means to cause said film to move continuously longitudinally, means to move the recorded portions of said film into planes inclined to the normal plane of the film, and a reflecting device traveling with and across said recorded portion to reflect beams of light from said recorded portion through said objective to a fixed position upon a screen.

8. In a continuous motion picture machine, the combination of an objective, a film having recorded portions cut on three sides, means to move said film longitudinally, means to move the recorded portions of said film in planes inclined to the normal plane of said film, a series of reflectors, means to move said reflectors in conjunction with said film and to synchronize the movement of said film and reflectors.

9. In a continuous motion picture machine, the combination of an objective, a record carrying a series of impressions or pictures, means for continuously moving said record through the field of illumination of said objective, means to incline the said impressions or pictures into a plane slightly oblique to the normal plane of said record, and means to maintain a fixed optical relationship between said objective and those impressions or pictures in the said field and to reflect said pictures through said objective to a fixed focused position.

10. In a continuous motion picture machine, the combination of an objective, a film carrying a series of impressions or pictures, means to move said impressions or pictures into a plane inclined to the normal plane of said film, means to continuously move said film through the field of said objective, means to reflect said pictures along a fixed pathway to said objective and thence to a fixed focused position, comprising a plurality of reflectors, and means to carry said reflectors with, across, and away from said film in a diagonal line.

Signed at New York, in the county of New York and State of New York, this 10th day of January, A. D. 1913.

MYRON F. HILL.
LEWIS D. HILL.

Witnesses:
SIMON YOHALEM,
LOTTIE TISCHLER.